United States Patent [19]

Ackeret

[11] Patent Number: 4,717,019
[45] Date of Patent: Jan. 5, 1988

[54] DISC CONTAINER

[75] Inventor: Peter Ackeret, Kusnacht, Switzerland

[73] Assignee: IDN Inventions and Development of Novelties AG, Chur, Switzerland

[21] Appl. No.: 865,748

[22] PCT Filed: Aug. 10, 1985

[86] PCT No.: PCT/EP85/00410

§ 371 Date: Apr. 17, 1986

§ 102(e) Date: Apr. 17, 1986

[87] PCT Pub. No.: WO86/01328

PCT Pub. Date: Feb. 27, 1986

[30] Foreign Application Priority Data

Aug. 17, 1984 [DE] Fed. Rep. of Germany ....... 8424403

[51] Int. Cl.⁴ ..................... B65D 85/57; B65D 85/672
[52] U.S. Cl. .................................. 206/307; 206/309; 206/444; 312/12
[58] Field of Search ............... 206/309, 387, 444, 307, 206/445; 312/8-19; 211/40

[56] References Cited

U.S. PATENT DOCUMENTS

| 1,014,929 | 1/1912 | Wood | 312/15 |
| 1,337,812 | 4/1920 | Allen | 312/17 |
| 2,475,495 | 7/1949 | Haag | 312/15 |
| 3,692,376 | 9/1972 | McKinsey et al. | 312/11 |
| 4,052,113 | 10/1977 | Broome | 312/11 |

FOREIGN PATENT DOCUMENTS

| 0112966 | 7/1984 | European Pat. Off. |
| 2307410 | 8/1974 | Fed. Rep. of Germany |
| 2004274 | 11/1969 | France |
| 0332665 | 7/1930 | United Kingdom |
| 0347332 | 4/1931 | United Kingdom |

Primary Examiner—Jimmy G. Foster
Attorney, Agent, or Firm—Chilton, Alix & Van Kirk

[57] ABSTRACT

Container for gramophone or video discs or similar flat recording media with a housing in which the discs may be housed in closely spaced adjacent storage compartments and may be removed individually, wherein a guide arrangement with an inlet opening which is wider than the width of the storage compartments in the direction of the disc thickness is provided, and wherein an outlet opening which may be brought according to choice into alignment with each storage compartment is provided.

31 Claims, 16 Drawing Figures

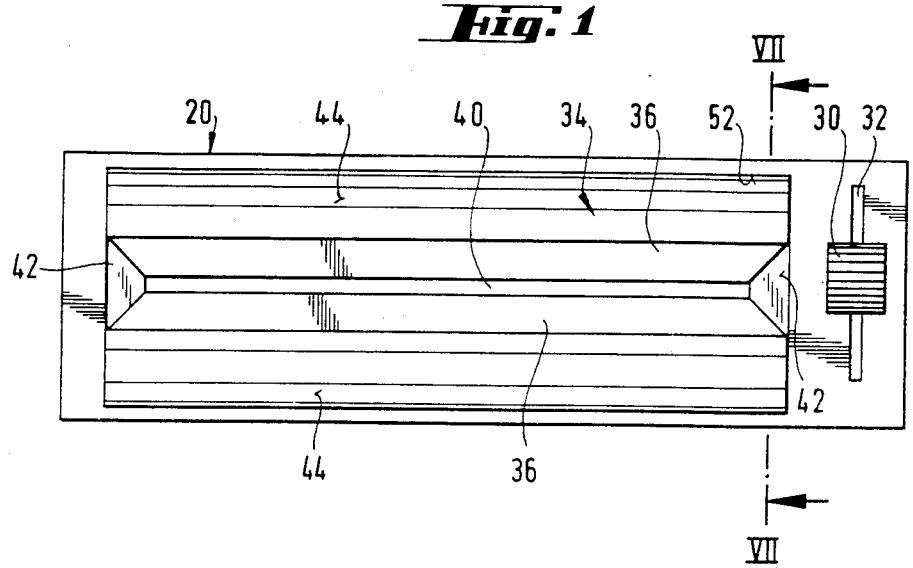
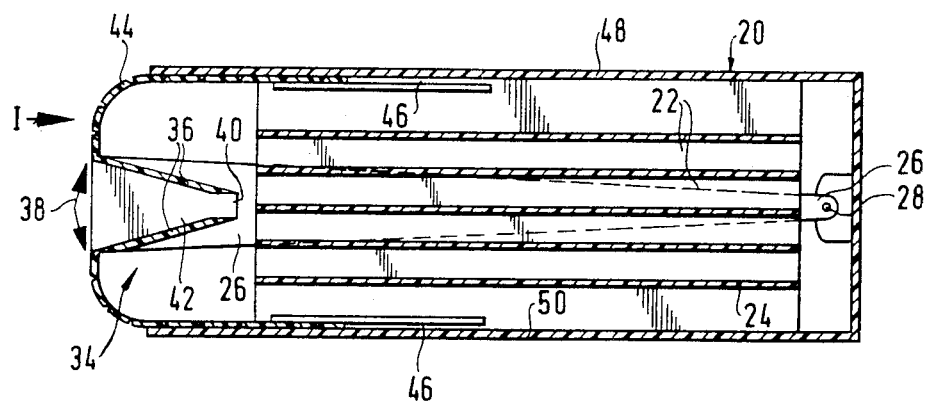

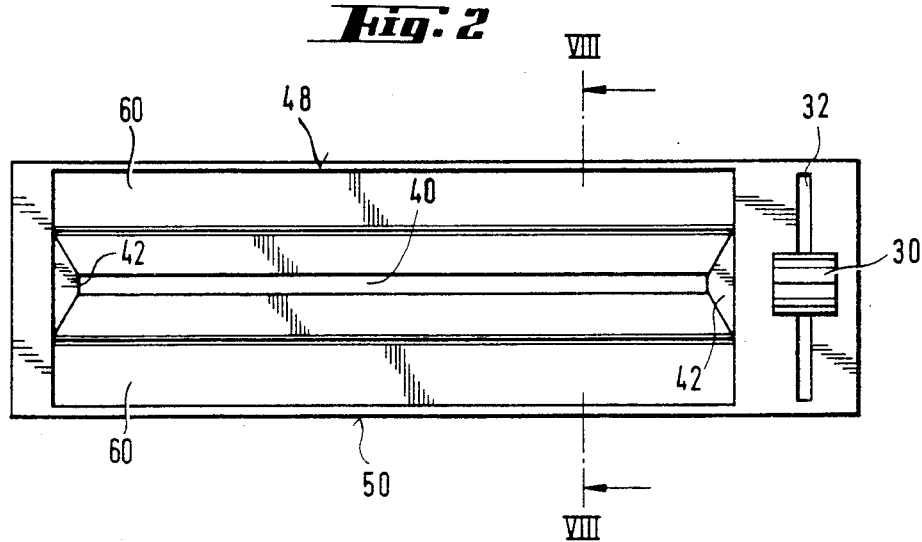
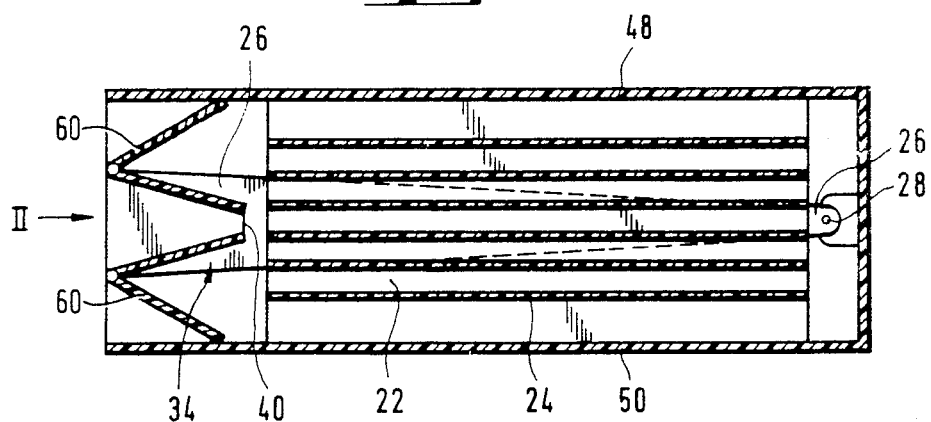

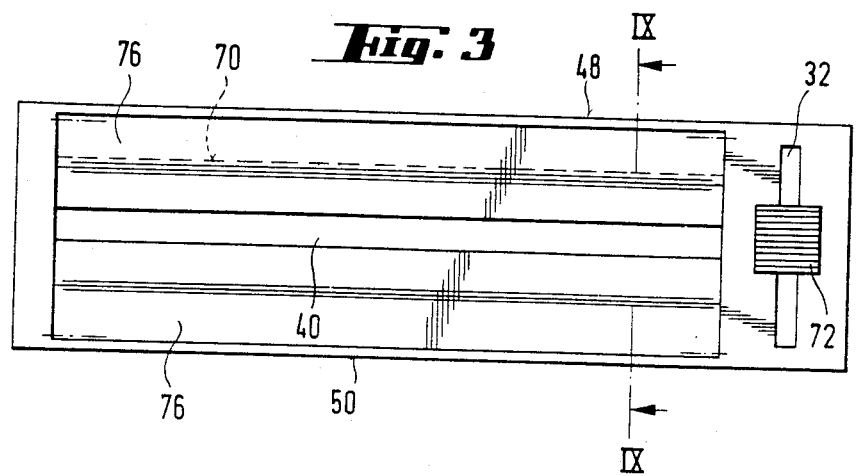
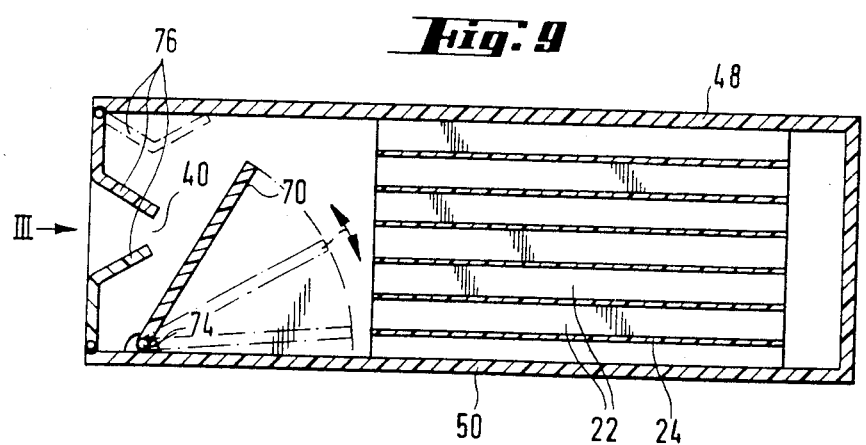

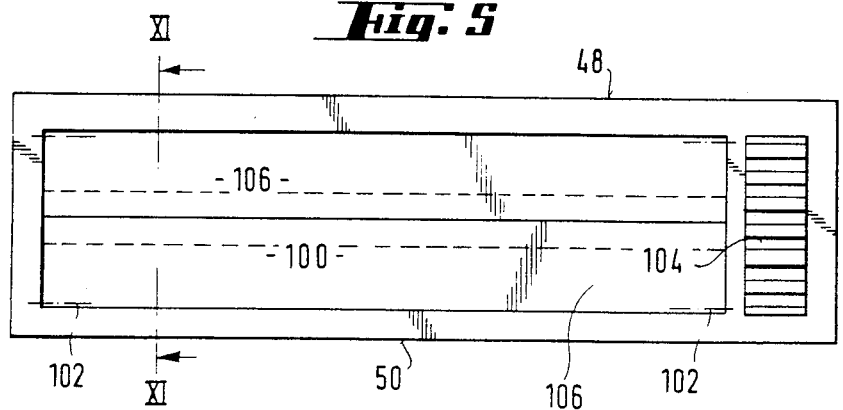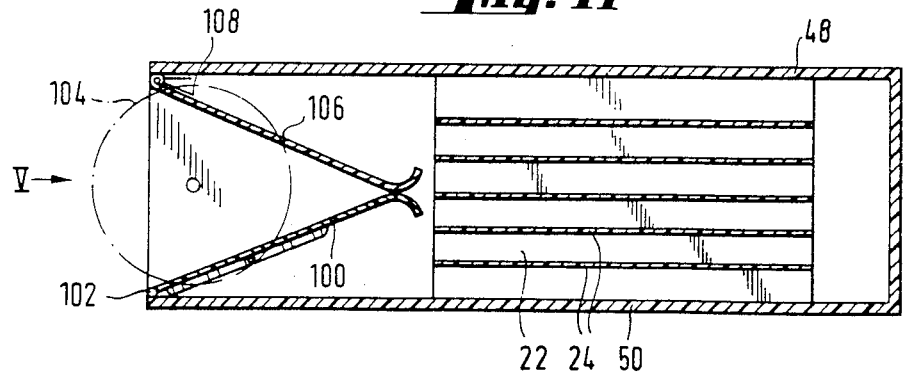

DISC CONTAINER

BACKGROUND OF THE INVENTION

This invention relates to the storage of recording media such as compact discs and magnetic diskettes. More particularly, the present invention is directed to a storage system comprising a housing in which the disc-shaped record media may be accommodated in closely spaced adjacent compartments and selectively removed individually. A storage system of this general type is described and illustrated in DE-C-1 131 026.

The known storage system is in fact a case for long-playing records. This case is provided with a drop-down door through which access may be had to a plurality of compartments which, in part, are defined by thin, disc-shaped holders. Each of these holders is configured to accommodate a long-playing record in its cardboard sleeve. A selector panel with selection buttons is arranged next to the compartments and by operating a selection button an associated holder is caused to be transported outwards a short distance by a spring arrangement so that the disc becomes accessible. To put away the disc, the operation proceeds inversely.

Modern recording media, for instance laser-scannable compact gramophone discs or video discs, are relatively insensitive to touch, so that they can be held even in the region of their recording tracks. In the case of the corresponding play-back devices for the so-called compact discs, there are types of design, especially for use in motor vehicles, in which the compact disc does not have to be placed axially on a disc turntable but is simply pushed through a slot in the front wall of the apparatus.

While not limited thereto in its utility, one of the objects of the present invention to produce a container which is especially suitable for compact discs, which takes into account the above-described conditions for use in motor vehicles.

In the environment of a motor vehicle, the selection and removal of a disc and the subsequent reinsertion into the relevant compartment of a storage system needs to be possible using one hand. Furthermore, operation of a vehicle-mounted recording media storage system ought be so simple that the driver's attention is not distracted from the traffic. Also, it should be possible to manufacture such a storage system, as a mass-produced product, as inexpensively as possible. The motor vehicle environment also often dictates that the storage system have high volumetric efficiency, and thus occupy a small amount of space, while retaining ease of operation. Starting from the features mentioned in the preamble of claim 1, the features mentioned in the characterising clause thereof are proposed for the solution to this problem.

When compact discs are packed together extremely closely in order to house a maximum number of discs in a minimum of space, the invention ensures that looking for a specific compartment, and more especially the insertion of the disc into this compartment, can nevertheless be carried out almost "without looking". The invention also enables the remaining requirements to be fulfilled, including inexpensive manufacture and operation with one hand, as will be explained in the following description of several embodiments.

The present invention will be better understood and its numerous objects and advantages will become apparent to those skilled in the art by reference to the accompanying drawings which are largely diagrammatic and are confined to the essential details.

FIGS. 1 to 6 show various storage systems according to the invention in front view, FIGS. 7 to 12 are respectively cross-sectional side elevation views of the embodiments of FIGS. 1 to 6.

DESCRIPTION OF THE DISCLOSED EMBODIMENTS

Figure 4:
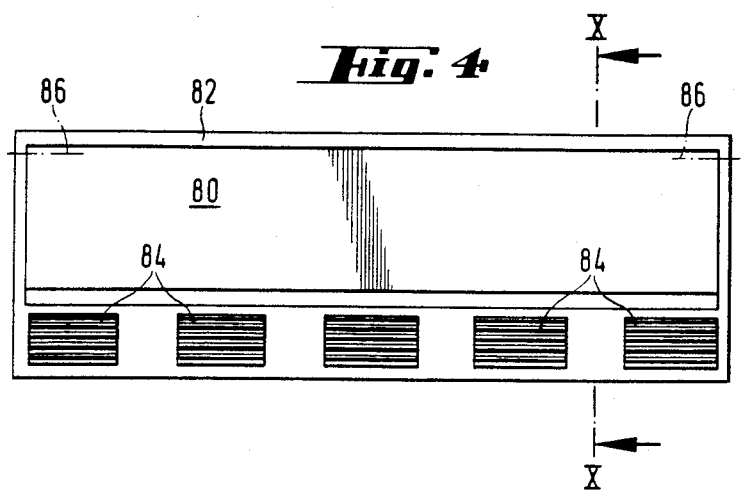

The container shown in FIGS. 1 and 7 comprises a housing 20 with plural storage compartments 22, the compartments 22 being designed to receive and support one compact disc each. The compartments are separated from one another by partitions 24 fitted immovably in the housing. Lever arms 26 are respectively pivotally mounted at opposite sides of and adjacent to the panels 24. The arms 26 are caused to pivot about an axis 28 by means of a control button or key 30 which is guided in a slot 32 beside the actual storage space of the housing 20. A guide arrangement 34 is mounted on and extends between the distal ends of the lever arms 26. The guide arrangement 34 consists of a pair of opposed guide surfaces 36. The guide surfaces 36 cooperate with the narrowing portions 42 of the lever arms 26 to define a generally funnel-shaped opening having a comparatively wide inlet 38 and a narrow outlet 40. The facing sides of guide surfaces 36 facing one another are preferably not flat, but are bowed outwards slightly so that a disc will contact the guide surfaces only in the track-free edge region of the disc. (This outwardly bowed guide surface arrangement is not illustrated in the drawings, but applies analogously to all embodiments. Flexible slats, e.g. segmented slats 44 are attached to the outer end edges of the guide surfaces 36. These slat segments, extend into guide grooves 46 loaded immediately beneath the top wall 48 of the housing and immediately above the bottom wall 50 of the housing, respectively. The opening 52 in the front wall of the housing 20 is, accordingly, completely covered in every position of the guide arrangement 34 with the exception of that portion of opening 52 which is in alignment with outlet 40 of the guide arrangement. The control key 30 has a locking arrangement (not illustrated) which locks the guide arrangement 34 in those positions in which its outlet 40 aligns with one of the storage compartments, i.e., the guide arrangement is indexed in stepwise fashion using the control key 30.

In the embodiment shown in FIGS. 2 and 8, the flexible slats provided in FIGS. 1 and 7 are replaced by flaps 60 biassed resiliently outwards which position themselves against the inner sides of the top and bottom walls of the housing in accordance with the position of the guide arrangement.

In the embodiment shown in FIGS. 3 and 9, the guide arrangement is in part formed by a flap 70 which can be pivoted, by means of a sliding control key 72, about an axis 74 to the desired locking position, so that its free edge aligns in each case with the lower edge of the selected storage compartment. The guide arrangement of the embodiment of FIGS. 3 and 9 also comprises a pair of angled members 76 which can be deflected resiliently outwardly respectively toward the top and bottom walls of the housing. The members 76 ensure that the design of the front wall of the storage system is aesthetically attractive.

Figure 10:
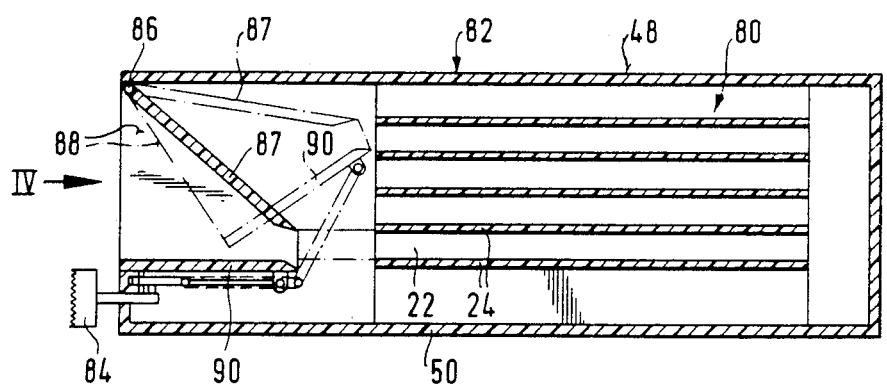

In the embodiment shown in FIGS. 4 and 10, beneath the storage space 80 of the housing 82, selection buttons 84 equal in number to the compartments in the housing are arranged. Operation of a selection button will cause a guide arrangement to be pivoted about an axis 86 into a locked position where its outlet is in alignment with one of the storage compartments of the housing. The guide arrangement comprises an upper flap 87 and a lower flap 90 which are interconnected by side members 88. The selection buttons 84, when pushed inwardly, contact a lever arm 92, moulded on the guide arrangement, of an articulated lever arrangement. The depth of inward travel of the buttons 84 is different for each compartment.

The embodiment shown in FIGS. 5 and 11 includes a guide arrangement consisting of a first guide plate 100 which is pivotally mounted on the lower edge 102 of the housing and can be brought, by means of a setting wheel 104, into locked positions. The free edge of a second guide plate 106 rests, under the bias of a coiled torsion spring 108 with projecting ends, on the free edge of the first guide plate. The rounded portions at the free ends of the two guide plates ensure that the line of contact of both guide plates is aligned with a selected storage compartment.

Figure 6:
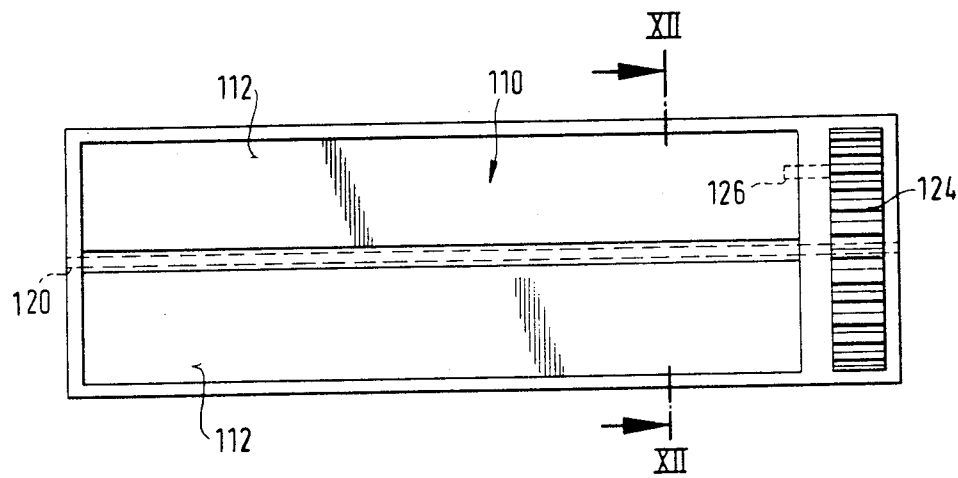
Figure 12:
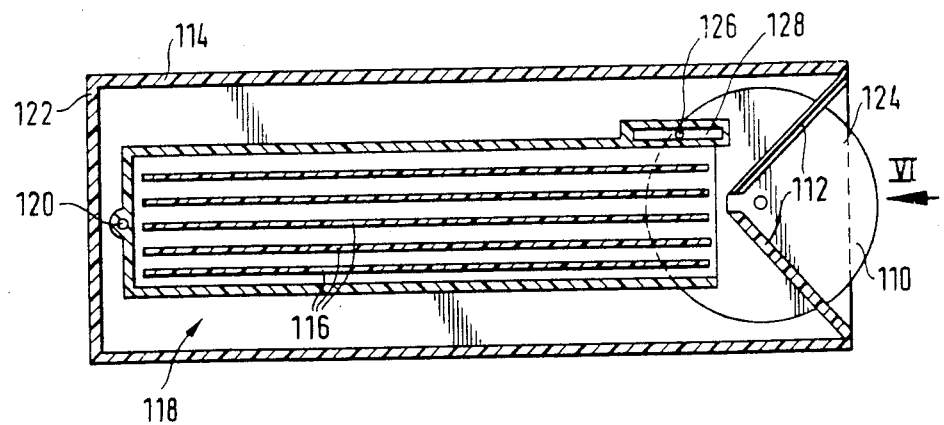

The embodiments described above are all based on the concept of the guide arrangement, or parts thereof, being movable relative to the housing and to the storage compartments. In the construction shown in FIGS. 6 and 12, however, the guide arrangement 110, consisting of guide surface defining plates or ledges 112 arranged in the front of the housing and projecting inwards in the manner of a funnel, is rigidly joined to the housing 114. The storage compartments 116 are located in an assembly 118 which is pivotally supported at a point 120 located adjacent to the rear wall 122 of the housing. The forwardly facing end of the assembly 118, i.e., the end where the storage compartments open, may be pivoted relative to the outlet of the guide arrangement. For this purpose, a hand wheel 124 with locking positions which may be turned by the user is provided. A driving pin 126 extends from wheel 124 into a slot 128 in the assembly 118 to couple the control wheel to the pivotal compartment assembly.

For reasons of clarity, FIGS. 1 to 12 show no details of the systems by means of which the individual discs can be conveyed from their storage compartments partly through the generally funnel-shaped guide opening of the guide arrangement to a position in which they can be gripped by the user.

Figure 13:
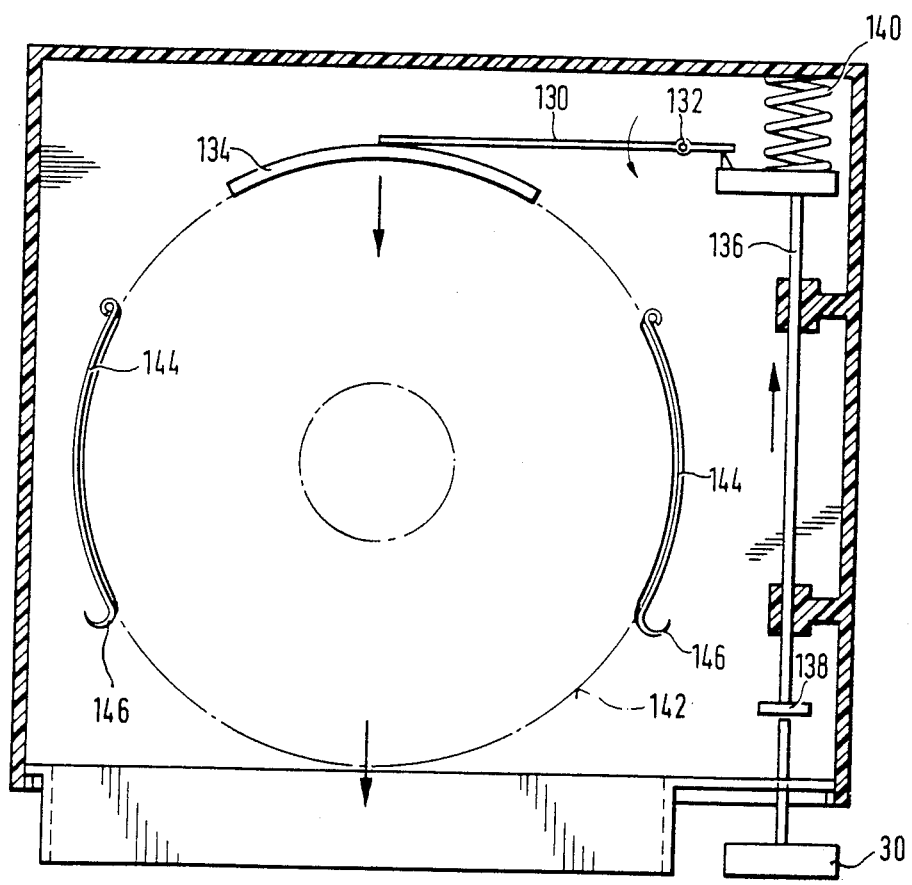
FIG. 13 shows in cross-section, parallel to the principle plane of the disc, a largely diagrammatic view of a disc-ejection system for use in the practice of the present invention.

FIG. 13 shows a first disc transporting arrangement which may be employed in the practice of the present invention. It may be assumed that the raminder of the construction of the apparatus of FIG. 13 corresponds to that shown in FIG. 1.

In the arrangement of FIG. 13, each compartment has its own ejector system. These ejector systems comprise an ejector lever 130 which is pivotable about an axis of rotation 132 and with its longer arm, which carries a shoe 134 matched to the contour of the disc, lying against the edge of the disc which is disposed the greatest distance from the front of the housing. The shorter arm of lever 130 is engaged by the first end of an actuating rod 136 which, at its its other end, is provided with a push plate 138. The actuating rods 136 are displaceable against the bias of springs 140. In each of its locked positions, of the control key 30 is located in front of one of the push plates 138. The control key 30 can itself be displaced inwards so that, by exerting pressure on it, the key movement is transferred to the push plate, from this to the rod 136 and from the rod to the lever 130, and the disc 142 is accordingly pushed outwards. Two leaf springs 144 matched to the contour of the disc, are mounted in each storage compartment. As the disc is pushed out springs 144 open outwards i.e., spread apart. The springs 144 ensure that the disc will be restrained whenever it is in the compartment or in the partially ejected position, since in the latter position the free ends 146 of the leaf springs still contact and thus check the disc. These leaf springs have yet a further function, namely that of conveying the disc inwards as it is pushed into an empty compartment. When the user has pushed the disc in sufficiently far for its diameter to have passed the free ends of the leaf springs the springs 144 will exert an insertion force on the disc. If the leaf springs are given a channel-shaped profile, matched to the disc, they may simultaneously define the individual storage compartments with respect to one another and no further additional partitions are necessary. The function of these leaf springs 144 is the same in the embodiments shown in FIGS. 14, 15 and 16.

Figure 14:
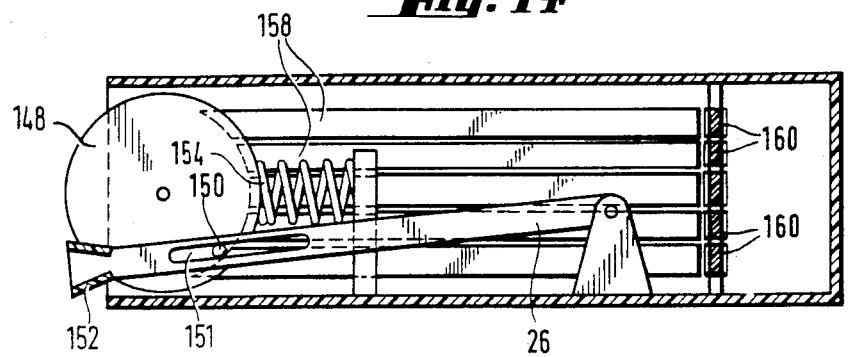
FIG. 14 is a view similar to that of FIGS. 7 to 12 of another embodiment of the invention.
Figure 15:
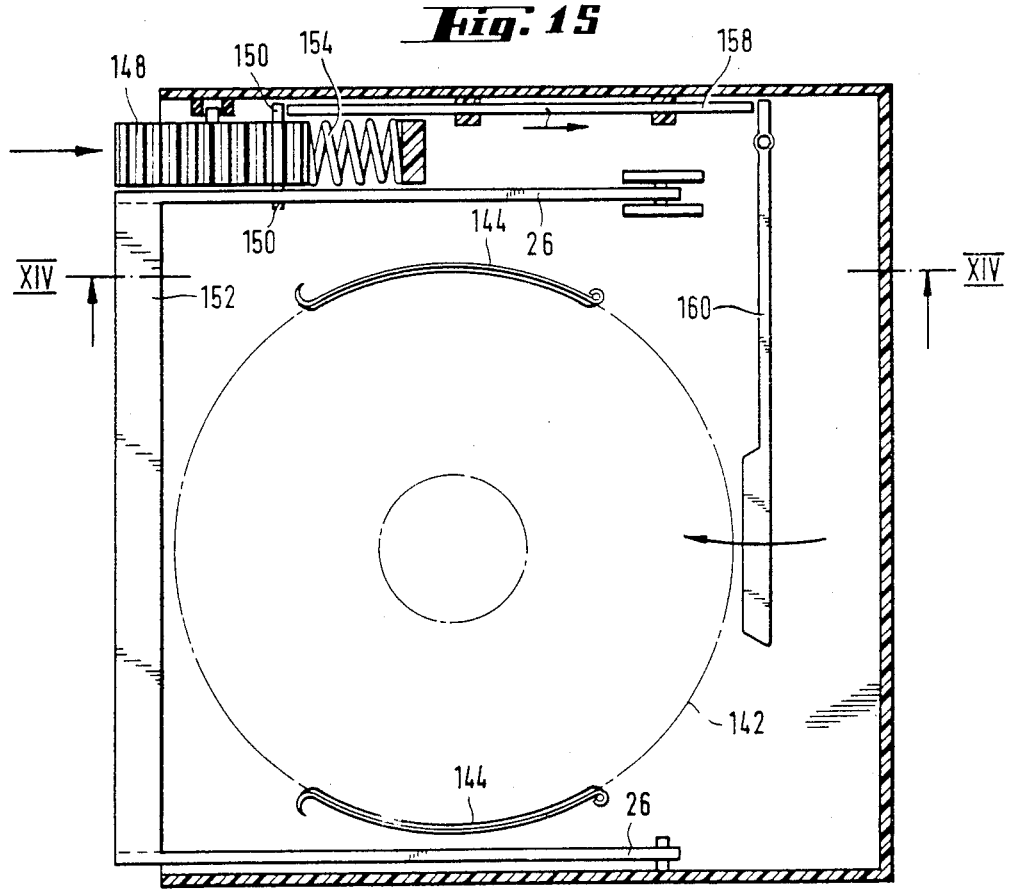
FIG. 15 is a view, similar to FIG. 13, of the embodiment of FIG. 14

The embodiment shown in FIGS. 14 and 15 differs from that shown in FIGS. 1, 7 and 13 in that, instead of the control key, there is provided a hand-wheel 148 which engages, via an eccentric pin 150, a slot 151 on the lever 26 which carries the guide arrangement 152. In each locked position, the hand-wheel can be displaced inwards against a restoring spring 154. When the hand-wheel is displaced inwardly it presses, by means of the pin 150 which extends to both sides of the hand-wheel, on the one of the rods 158 which is associated with the selected compartment. The rod 158, in turn, pushes against its associated ejector lever 160.

Figure 16:
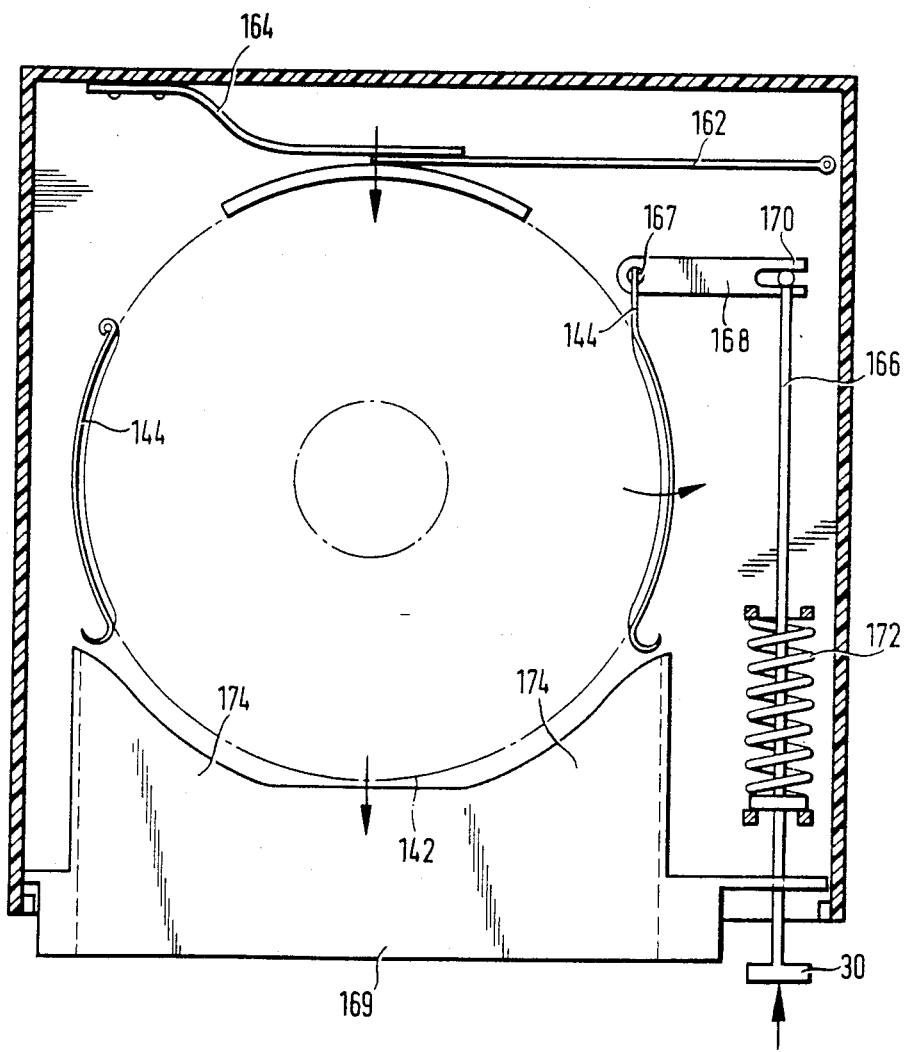
FIG. 16 is a view similar to FIGS. 13 and 15 which depicts an alternate disc-ejection system for use in the practice of the present invention.

In the embodiment shown in FIG. 16, the ejector lever 162 is biased resiliently outwards by a leaf spring 164, but this bias in not sufficient to overcome the retaining force of the leaf springs 144. Only when the one leaf spring 144, which is mounted on an adjusting lever 168 pivotable about an axis 167, is pivoted away from the disc by pressing on the actuating rod 166 is the leaf spring 164 able to push the disc sufficiently far outwards for it to be gripped by the user in the inlet to the guide arrangement 169. When the control key 30 is released, the rod 166 transfers the bias of its restoring spring 172 via the fork 170 to the adjusting lever 168, so that this returns to its initial position again. On account of the lever arm ratios, the bias of the restoring spring 172 is sufficient to hold the leaf spring 144 mounted on the adjusting lever in its normal position while a disc is being inserted, so that the combined inwardly directed force exerted by the two leaf springs on the disc is sufficient to overcome the bias of the ejection spring 164.

If, as mentioned above, the leaf springs 144 themselves act as the means defining the individual storage compartments, it is advisable to lengthen the guide arrangement somewhat in the direction of the housing, as shown in FIG. 16, this may be accomplished by employing concavely curved partitions as the guide surfaces so that the disc is able to run exactly into the leaf springs having the channel-shaped profile. Such extended guide surfaces on both sides of the axis of symmetry of the disc are indicated in FIG. 16 at 174.

What is claimed is:

1. A container for use in the storage of flat recording media comprising:
   a housing;
   a storage assembly supported within said housing, the storage assembly defining a plurality of closely-spaced adjacent storage areas for receiving and supporting said recording media;
   guide means for directing the motion of an individual recording media during the transfer thereof between said storage assembly and the exterior of said housing and during the return thereof to said storage assembly, said guide means being positioned in said housing and including guide members which define a media guide channel, said guide channel having surfaces which converge from the exterior of the housing toward said storage assembly, said guide channel having a maximum width at a first end thereof which is greater than the width of one of said storage assembly defined storage areas measured in the direction of the recording media thickness; and
   means for producing relative motion between said guide means and said storage assembly whereby alignment may be selectively established between one of said storage areas and the path of the said recording media motion directed by said guide means.

2. A container according to claim 1 characterized in that said guide means is movable relative to said housing and to the storage areas defined thereby.

3. A container according to claim 2 characterized in that said housing has a front opening through which all storage areas of said storage assembly are accessible, and said guide means is movable in said housing front opening.

4. A container according to claim 3 wherein said guide means further comprises segmented panel means which cover the part of said housing front opening which is not occupied by said guide channel.

5. A container according to claim 4 wherein said segmented panel means are attached to and form part of said guide means.

6. A container according to claim 3 wherein said guide means includes at least a first flap which is hinged to said housing.

7. A container according to claim 6 wherein said guide means includes a pair of lever arms which are pivotally attached to said housing in the vicinity of a rear wall of said housing which is disposed opposite to the said housing front opening, the members which define said guide channel being supported from said lever arms.

8. A container according to claim 1 further comprising means for imparting motion to the recording media at least during the transfer thereof between said storage areas and the exterior of said housing.

9. A container according to claim 8 wherein said motion imparting means will cause the recording media to be conveyed through said guide means and be presented at the said first end thereof.

10. A container according to claim 9 wherein at least a part of said motion imparting means is movable jointly with said guide means.

11. A container according to claim 8 characterized in that at least a part of the said motion imparting means is movable with said guide means.

12. A container according to claim 8 characterized in that each storage area is provided with its own motion imparting means.

13. A container according to claim 12 further comprising actuating means for said motion imparting means, said actuating element being coupled at each selected alignment position of said storage arrangement with a transfer element of motion imparting means associated with a storage area of said storage arrangement.

14. A container according to claim 8 wherein said means includes an actuating element contacting and acting upon a stored recording media for imparting motion to the media to cause the media to move from the stored position into said guide channel.

15. A container according to claim 14 wherein said actuating element may be moved in a first direction for the adjustment of said guide means and in a second direction for actuating said motion imparting means to transport stored recording media in the direction of said guide means.

16. A container according to claim 15 wherein a separate motion imparting means is provided for each storage area and wherein said actuating element may be coupled to a separate motion imparting means at each selected alignment position between said guide means and said storage assembly.

17. A container according to claim 14 wherein said actuating element disables said retaining means.

18. A container according to claim 8 further comprising retaining means for releasably locking recording media in the storage areas of said storage assembly.

19. A container according to claim 1 further comprising retaining means for releasably locking recording media in the storage areas of said storage assembly.

20. A container according to claim 19 characterized in that the said retaining means are of resilient construction.

21. A container according to claim 20 wherein said resilient retaining means exerts a force directed away from said guide means on recording media positioned in said storage areas.

22. A container according to claim 21 wherein said retaining means comprise leaf springs which contact the edges of the recording media.

23. A container according to claim 21 further comprising a spring-loaded ejector for imparting motion to stored recording media whereby said media will be transported out of a storage area, said ejector operating on the recording media after the disabling of said retaining means, said retaining means being disabled by operation of said actuating element.

24. A container according to claim 21 further comprising means for disabling said retaining means.

25. A container according to claim 1 characterized in that the guide means is rigidly joined to said housing and said storage assembly is movable relative to said guide means.

26. A container according to claim 1 wherein said means for producing relative motion comprises means for manually moving said guide means into a selected alignment position and locking said guide means in the selected position.

27. A container according to claim 26 wherein said means for manually moving said guide means comprises an adjusting lever for said guide means.

28. A container according to claim 26 wherein said means for manually moving said guide means comprises an adjusting hand-wheel for said guide means.

29. A container according to claim 26 wherein each locked position of said guide means is defined by a separate manually operable adjusting element.

30. A container according to claim 26 further comprising an actuating element for the adjustment of said guide means, said actuating element contacting and acting upon a stored recording media for imparting motion to the media to cause the media to move from the stored position into said guide channel.

31. A container according to claim 30 wherein said actuating means may be moved in a first direction for the adjustment of said guide means and in a second direction for imparting motion to recording media.

* * * * *